US012711679B2

(12) United States Patent
Guo

(10) Patent No.: US 12,711,679 B2
(45) Date of Patent: Aug. 18, 2026

(54) IMAGE RENDERING METHOD AND APPARATUS, DEVICE, STORAGE MEDIUM, AND PROGRAM PRODUCT

(71) Applicant: BEIJING BYTEDANCE NETWORK TECHNOLOGY CO., LTD., Beijing (CN)

(72) Inventor: Guanjun Guo, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 210 days.

(21) Appl. No.: 18/704,427

(22) PCT Filed: Nov. 2, 2022

(86) PCT No.: PCT/CN2022/129186
§ 371 (c)(1),
(2) Date: Apr. 24, 2024

(87) PCT Pub. No.: WO2023/078284
PCT Pub. Date: May 11, 2023

(65) Prior Publication Data

US 2025/0022195 A1 Jan. 16, 2025

(30) Foreign Application Priority Data

Nov. 5, 2021 (CN) ......................... 202111308496.5

(51) Int. Cl.
*G06T 11/60* (2026.01)
*G06T 7/11* (2017.01)
(Continued)

(52) U.S. Cl.
CPC ................ *G06T 11/60* (2013.01); *G06T 7/11* (2017.01); *G06T 7/90* (2017.01); *G06V 10/60* (2022.01);
(Continued)

(58) Field of Classification Search
CPC ... G06T 11/60; G06T 7/11; G06T 7/90; G06T 2207/10024; G06T 2207/30176;
(Continued)

(56) References Cited

U.S. PATENT DOCUMENTS 10,049,477 B1 * 8/2018 Kokemohr .............. G06T 11/60
2009/0323089 A1 * 12/2009 Hayasaki ............... H04N 1/642
358/1.9
(Continued)

FOREIGN PATENT DOCUMENTS

CN 104076928 A 10/2014
CN 105631797 A 6/2016
(Continued)

OTHER PUBLICATIONS

International Patent Application No. PCT/CN2022/129186; Int'l Written Opinion and Search Report; dated Dec. 28, 2022; 6 pages.
(Continued)

*Primary Examiner* — Xilin Guo
(74) *Attorney, Agent, or Firm* — BakerHostetler

(57) ABSTRACT

Embodiments of this disclosure discloses an image rendering method, an apparatus, a device, a storage medium, and a program product. The image rendering method includes processing an image to be rendered to determine a text area determining a target character style of text based on attribute information of the text area determining a target pattern style of text based on the image to be rendered; and rendering the image to be rendered based on the target character style of text and the target pattern style of text.

20 Claims, 5 Drawing Sheets

(51) Int. Cl.
*G06T 7/90* (2017.01)
*G06V 10/60* (2022.01)
*H04N 1/60* (2006.01)

(52) U.S. Cl.
CPC . *H04N 1/6002* (2013.01); *G06T 2207/10024* (2013.01)

(58) Field of Classification Search
CPC .......... G06T 2207/20021; G06V 10/60; G06V 30/10; G06V 30/413; G06V 20/62; G06V 30/40; H04N 1/6002; G06F 3/0482; G06F 3/04883
See application file for complete search history.

(56) References Cited

U.S. PATENT DOCUMENTS

| | | | | |
|---|---|---|---|---|
| 2019/0266433 | A1* | 8/2019 | Foroughi | G06T 7/194 |
| 2019/0294652 | A1* | 9/2019 | Kang | G06F 40/10 |
| 2020/0410686 | A1 | 12/2020 | Zhang | |
| 2022/0335667 | A1* | 10/2022 | Dhanuka | G06F 3/04847 |

FOREIGN PATENT DOCUMENTS

| | | | |
|---|---|---|---|
| CN | 107577654 | A | 1/2018 |
| CN | 108010039 | A | 5/2018 |
| CN | 108550101 | A | 9/2018 |
| CN | 109408177 | A | 3/2019 |
| CN | 110457523 | A | 11/2019 |
| CN | 111161377 | A | 5/2020 |
| CN | 111596998 | A | 8/2020 |
| CN | 112511907 | A | 3/2021 |
| CN | 112752121 | A | 5/2021 |
| CN | 112949755 | A | 6/2021 |
| CN | 113377455 | A | 9/2021 |
| CN | 113989396 | A | 1/2022 |

OTHER PUBLICATIONS

China Patent Application No. 202111308496.5; Office Action; dated Apr. 30, 2024; 11 pages.
Rejection Decision for Chinese Patent Application No. 202111308496.5, mailed on May 29, 2025, 10 pages.
China Patent Application No. 202111308496.5; Second Office Action; dated Nov. 7, 2024; 12 pages.

* cited by examiner

IMAGE RENDERING METHOD AND APPARATUS, DEVICE, STORAGE MEDIUM, AND PROGRAM PRODUCT

CROSS-REFERENCE TO RELATED APPLICATIONS

The present disclosure is a U.S. National Stage Application under 35 U.S.C. § 371 of International Patent Application No. PCT/CN2022/129186, filed on Nov. 2, 2022, which is based on and claims priority of Chinese application for invention No. 202111308496.5, filed on Nov. 5, 2021, the disclosure of which is hereby incorporated into this disclosure by reference in its entirety.

TECHNICAL FIELD

This disclosure relates to the technical field of image processing, in particular to an image rendering method, an apparatus, a device, a storage medium, and a program product.

BACKGROUND

With the progress of science and technology, video technology is becoming more sophisticated. In common video sites or applications, video recommendations are made by presenting recommendation images to users.

SUMMARY

In a first aspect, embodiments of the present disclosure provide an image rendering method, comprising:

- processing an image to be rendered to determine a text area;
- determining a target character style of text based on attribute information of the text area;
- determining a target pattern style of text based on the image to be rendered; and
- rendering the image to be rendered based on the target character style of text and the target pattern style of text.

In a second aspect, embodiments of the present disclosure provide an image rendering apparatus, comprising:

- a text area determination module for processing an image to be rendered to determine a text area;
- a character style determination module for determining a target character style of text based on attribute information of the text area;
- a pattern style determination module for determining a target pattern style of text based on background color information of the image to be rendered; and
- a rendering module for rendering the image to be rendered based on the target character style of text and the target pattern style of text.

In a third aspect, embodiments of the present disclosure provide an electronic device, comprising:

- one or more processors;
- a storage device for storing one or more programs that, when executed by the one or more processors, cause the one or more processors to implement the image rendering method according to any embodiments of the first aspect.

In a fourth aspect, embodiments of the present disclosure provide a non-transitory computer-readable medium having stored thereon a computer program that, when executed by a processor, implements the image rendering method according to any embodiments of the first aspect.

In a fifth aspect, embodiments of the present disclosure provide a non-transitory computer program product comprising computer programs or instructions that, when executed by a processor, implement the image rendering method according to any embodiments of the first aspect.

BRIEF DESCRIPTION OF THE DRAWINGS

The above and other features, advantages, and aspects of the embodiments of the present disclosure will become more apparent from the following embodiments with reference to the drawings. Throughout the drawings, the same or similar reference signs indicate the same or similar elements. It should be understood that the drawings are schematic and the components and elements are not necessarily drawn to scale.

DETAILED DESCRIPTION

Exemplary embodiments of the present disclosure will now be described in detail with reference to the accompanying drawings. Although some embodiments of the present disclosure are shown, it should be understood that the present disclosure can be implemented in various forms, and should not be construed as being limited to the embodiments set forth herein. On the contrary, these embodiments are provided for a more thorough and complete understanding of the present disclosure. It should be understood that the drawings and embodiments of the present disclosure are only used for exemplary purposes, and are not used to limit the scope of protection of the present disclosure.

It should be understood that the various steps described in the methods of the embodiments of the present disclosure may be executed in a different order, and/or executed in parallel. In addition, the methods may include additional steps and/or some of the illustrated steps may be omitted. The scope of this disclosure is not limited in this regard.

The term "comprising" and its variants as used herein is an open-ended mode expression, that is, "comprising but not limited to". The term "based on" means "based at least in part on". The term "one embodiment" means "at least one embodiment"; The term "another embodiment" means "at least one additional embodiment"; The term "some embodiments" means "at least some embodiments". Related definitions of other terms will be given in the following description.

It should be noted that the concepts of "first" and "second" mentioned in the present disclosure are only used to distinguish different devices, modules or units, and are not used to limit the order of functions performed by these devices, modules or units, or interdependence therebetween.

It should be noted that the modifications of "a" and "a plurality of" mentioned in the present disclosure are illustrative and not restrictive, and those skilled in the art should understand that unless clearly indicated in the context, they should be understood as "one or more".

The names of messages or information exchanged between multiple devices in the embodiments of the present disclosure are only used for illustrative purposes, and are not used to limit the scope of these messages or information.

In related technologies, recommendation images displayed to users require manual rendering by post-production staff, resulting in slower rendering speed and lower efficiency.

In order to solve or at least partially solve the above technical problem, embodiments of the present disclosure provide an image rendering method, apparatus, device, storage medium and program product capable of harmoniously and aesthetically placing given text in an image to achieve fast rendering of the image. The following is a detailed introduction to the image rendering method proposed in the present embodiments, with reference to the accompanying drawings.

Figure 1:
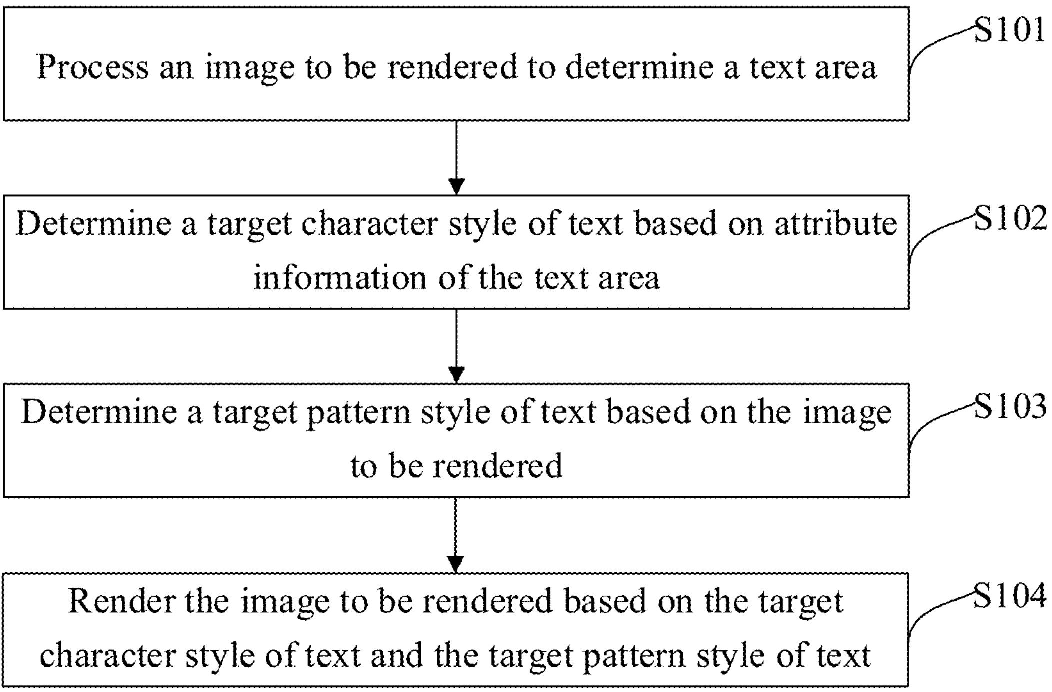
FIG. 1 is a flowchart of an image rendering method according to embodiments of the present disclosure.

FIG. 1 is a flowchart of an image rendering method according to embodiments of the present disclosure, suitable for adding text to any image. The image rendering method can be performed by an image rendering apparatus, which can be implemented in software and/or hardware, and can be configured in an electronic device.

For example, the electronic device can comprise mobile terminal, a fixed terminal or a portable terminal, such as a mobile phone, a station, a unit, a device, a multimedia computer, a multimedia tablet, an Internet node, a communicator, a desktop computer, a laptop computer, a netbook computer, a tablet computer, a personal communication system (PCS) device, a personal navigation device, a personal digital assistant (PDA), an audio/video player, a digital camera/video camera, a positioning device, a television receiver, a radio broadcast receiver, an e-book device, a gaming device or any combination thereof, including accessories and peripherals of these devices or any combination thereof.

For another example, the electronic device may be a server, wherein the server can be a physical server or a cloud server; it may be a server or a server cluster.

As shown in FIG. 1, the image rendering method provided in this embodiment includes the following steps.

S101: processing an image to be rendered to determine a text area.

The image to be rendered can be any given image. For example, it can be a photo to which text needs to be added, or any video frame extracted from a video. These embodiments are only used for illustrating the term "image to be rendered", and are not for limitation.

The text area can be understood as a connected domain where text will be added to in the image to be rendered. Text can be added to the text area. The text refers to text information related to the image to be rendered. The above text information can be determined based on information about the image to be rendered, or it can be user-entered text that needs to be added to the image to be rendered.

For example, in a case where the image to be rendered is an image in a video, the text information can be the name of the video. For another example, the above text information can be the main content of the image to be rendered, such as "mountains" or "trees", etc. For another example, the above text information can be user-specified text information, wherein the user-specified text information is entered by a user through an input device.

In some embodiments, the connected domain is selected as the text area at any position in the image to be rendered. For example, a connected domain in the middle of the image to be rendered is selected as the text area, or a connected domain at an upper left position of the image to be rendered is selected as the text area. Furthermore, the above text area can be selected as an area in the image to be rendered where the added text will not obscure a major part of the image.

In some embodiments, a selection operation of a user on the image to be rendered is received, and an area selected by the user in the image to be rendered is used as the text area. For example, the user can manually select a rectangular connected domain in the image to be rendered, and the rectangular connected domain is used as the text area.

In some embodiments, the image to be rendered is input into a pre-trained segmentation model, and the text area corresponding to the image to be rendered is determined based on an image mask output by the pre-trained segmentation model.

Step 102: determining a target character style of text based on attribute information of the text area.

The attribute information of the text area may be at least one of a width or a height of a bounding rectangular box of the text area, wherein the width or the height may be represented in a unit of length or in pixels, which is not specifically limited in this embodiment.

The character style can be understood as information representing text characteristics, such as character size, character typeface, character font, character spacing, or a relative position of text in the text area. The character size refers to information that represents the size of text characters, such as Size 0, Small Size 0, Size 1, Size 2, etc.; The typeface refers to information that represents the form style of Chinese characters, such as Regular, Song, Blackbody, or information that represents a form style of characters in other languages. The character font refers to information that represents a special effect of text, such as Bold, Italics, etc. Furthermore, the above characters can be any existing written text characters such as Chinese characters, English letters, Korean characters, Greek letters, Arabic numerals, etc., and can also be any written symbol such as "%", "@", "&", etc.

Furthermore, a target character size of text is determined based on the width of the bounding box of the text area. That is, the text characters in the target character size can fill the entire text area. Optionally, the bounding box of the text area is a rectangular bounding box, and the width of the bounding box can be understood as a length on the horizontal axis in a two-dimensional coordinate system.

In some embodiments, a calculation of the target character size is performed for each size, starting with the largest size, to calculate a text width corresponding to that character size, and to determine in a case where the text width is less than or equal to the width of the bounding box of the text area. The text width refers to a length corresponding to all the text characters in a character size. For example, for small size 2, if the width of each character is 6.3 mm and the number of text characters is 10, the text width is 63 mm.

In some embodiments, a width of one character is determined for each character size; a ratio of the width of the bounding box to the number of text characters is calculated, and a character size corresponding to a character width closest to this ratio is determined as the target character size. For example, a width of one character is 9.8 mm, 7.4 mm, 6.3 mm, and 5.6 mm for Size 1, Size 2, Small Size 2, and Size 3, respectively. If the width of the bounding box is 60 mm and the number of text characters is 9, the ratio of the width of the bounding box to the number of text characters is 6.67. This ratio is closest to 6.3 mm, and Small Size 2 corresponding to 6.3 mm is selected as the target character size of text.

In some embodiments, starting with the largest character size, a number of text characters that can be accommodated by the width of the bounding box is calculated for each character size until the number of text characters that can be accommodated exceeds the actual number of characters. Then, a character size corresponding to the number of text characters that can be accommodated is determined as the target character size of text. For example, the width of one character is 9.8 mm, 7.4 mm, 6.3 mm, and 5.6 mm for Size 1, Size 2, Small Size 2, and Size 3, respectively. In a case where the width of the bounding box is 70 mm and the actual number of characters is 10, 7.1, 9.4, and 11 characters can be accommodated for Size 1, Size 2, and Small Size 2, respectively. The number of characters that can be accommodated corresponding to Small Size 2 is greater than the actual number of characters, and thus Small Size 2 is determined as the target character size.

In some embodiments, a system default typeface is used as the target text typeface, or a target typeface can be determined in response to a typeface selection operation of the user.

In some embodiments, a system default font (such as Roman) is used as the target text font, or the target font can be determined in response to a font selection operation (bold, italics) of the user.

S103: determining a target pattern style of text based on the image to be rendered.

The pattern style can be understood as a special effect for text fills or borders. Optionally, the target pattern style can be any one or more of a target color, a target texture or a target effect, etc. The target color can be a color corresponding to a color value or a gradient color corresponding to multiple color values. The target texture can be understood as a text filling texture, wherein the target texture can be a system default texture, or it can be determined in response a texture selection operation of the user. The target effect can be one or more of adding shadows, reflections, adding text borders, lighting or 3D effects, and so on.

In some embodiments, the target color of text can be determined based on color information of the image to be rendered. The color information can be represented in any of the RGB color system, the HSV color space, or the HSL color space.

The RGB color system comprises various colors obtained by changing the red (R), green (G), and blue (B) color channel values and overlaying them with each other.

In some embodiments, values corresponding to the three color channels in the RGB color system of the image to be rendered are extracted and set directly as the target color of text.

In some embodiments, values corresponding to the three color channels in the RGB color system corresponding to the text area are extracted, and a color corresponding to these values is determined. Then, a complementary color of this color is determined as the target color of text. For example, after color extraction performed on the text area, in response to the color corresponding to the RGB values being red, a complementary color of red, i.e., green, is determined as the target color of text.

In the HSV color space, a color is represented by three parameters: Hue (H), Saturation (S), and Brightness Value (V). The HSV color space is a three-dimensional representation of the RGB color system.

In some embodiments, H values in the HSV color space are extracted for the image to be rendered, and an average H value of the corresponding text area is calculated to find a color value with the greatest difference from H_Avg as the text color value.

In some embodiments, any portion of the image to be rendered can be extracted as the target text texture.

S104: rendering the image to be rendered based on the target character style of text and the target pattern style of text.

In this embodiment, characters are rendered and displayed within the text area according to a certain rule based on the target character style of text and target pattern style of text. The above rule comprises: Center Align, Left Align, Right Align, etc. The specific display rendering method will not be specifically introduced in this embodiment.

The embodiments of the present disclosure provide an image rendering method, comprising: processing an image to be rendered to determine a text area; determining a target character style of text based on attribute information of the text area; determining a target pattern style of text based on the image to be rendered; and rendering the image to be rendered based on the target character style of text and the target pattern style of text. In the embodiments of the present disclosure, a text character style is determined based on the obtained text area, a text pattern style is determined based on the image to be rendered, and text characters are rendered based on the text character style and the text pattern style and then added to the text area in the image. Thus, the text can be placed in the image harmoniously and aesthetically, thereby achieving fast rendering of the image.

Figure 2:
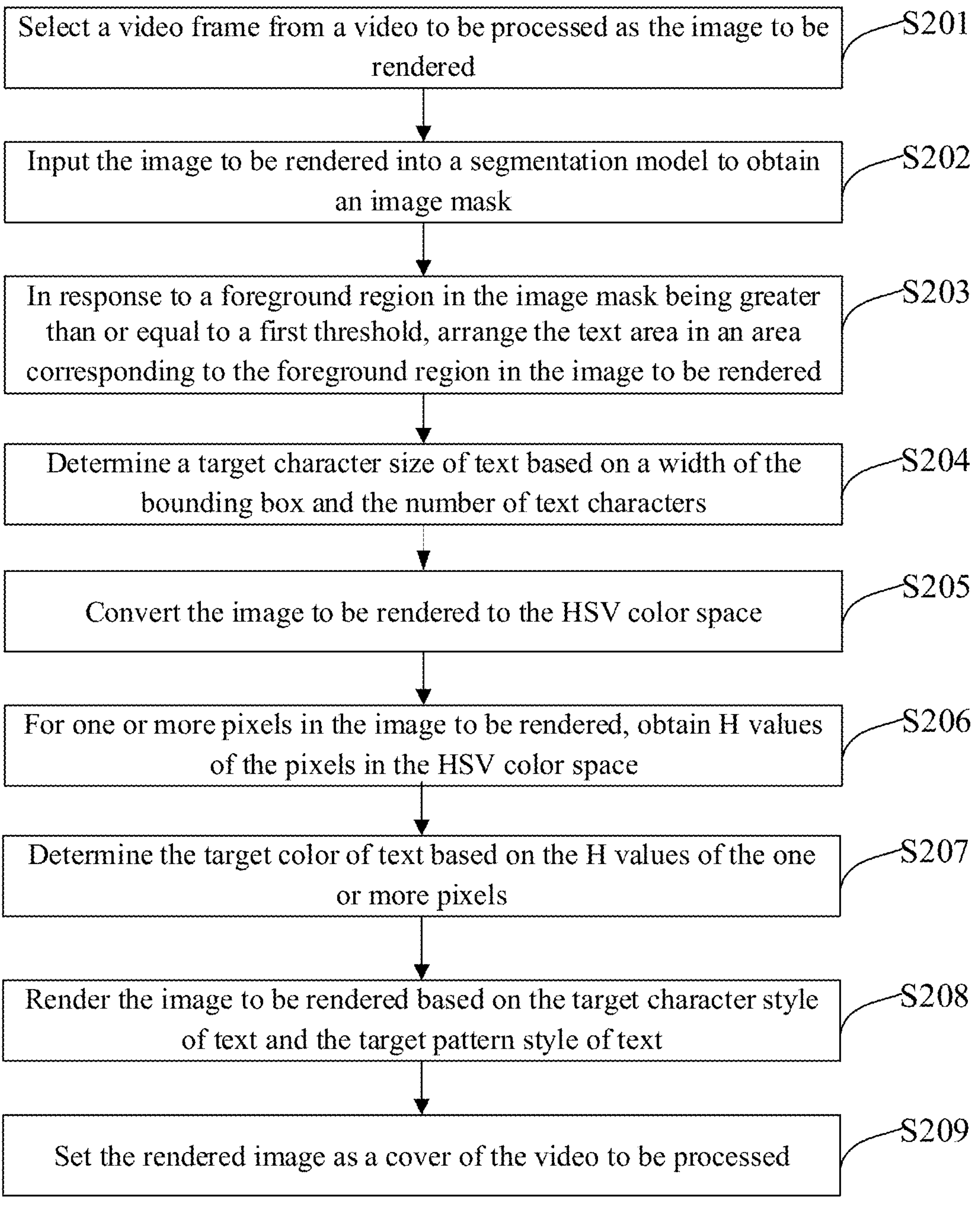
FIG. 2 is a flowchart of an image rendering method according to embodiments of the present disclosure.

On the basis of the above embodiments, an embodiment of the present disclosure further optimizes the image rendering method. FIG. 2 is a flowchart of the optimized image rendering method provided in an embodiment of the present disclosure. As shown in FIG. 2, the optimized image rendering method provided in this embodiment mainly comprises the following steps.

S201: selecting a video frame from a video to be processed as the image to be rendered.

The video here generally refers to a video composed of multiple video frames, such as a short video, a live streaming video, a movie video, etc., which is not limited in this application. The video to be processed, for example, is a video without a cover image.

In this embodiment, the image rendering method provided in this embodiment, namely steps S201-S207, can be carried out after receiving a cover generation instruction. The cover generation instruction can be generated and sent in response to a cover operation by a user, or it can be generated and sent automatically after receiving a video uploaded by a user and determining that the video does not have a cover.

A video cover refers to an image used to present a video summary. It can be a static image, which can also be called a static video cover. The video cover can also be a dynamic video clip, which can also be called a dynamic video cover. For example, a cover image presented in a video list on a video platform can help users get a sense of the live content.

In some embodiments, any frame of a video to be processed can be selected as the image to be rendered; alternatively, based on a user selection operation, a video frame can be selected by a user as the image to be rendered.

S202: inputting the image to be rendered into a segmentation model to obtain an image mask.

A method for training a segmentation model is provided in this embodiment, mainly comprising: collecting data samples mainly comprising base images and image masks; and inputting the collected data samples into a neural network model for training to obtain the segmentation model.

The image mask can be obtained by performing processes by the segmentation model after inputting the image to be rendered into the segmentation model.

Figure 3:
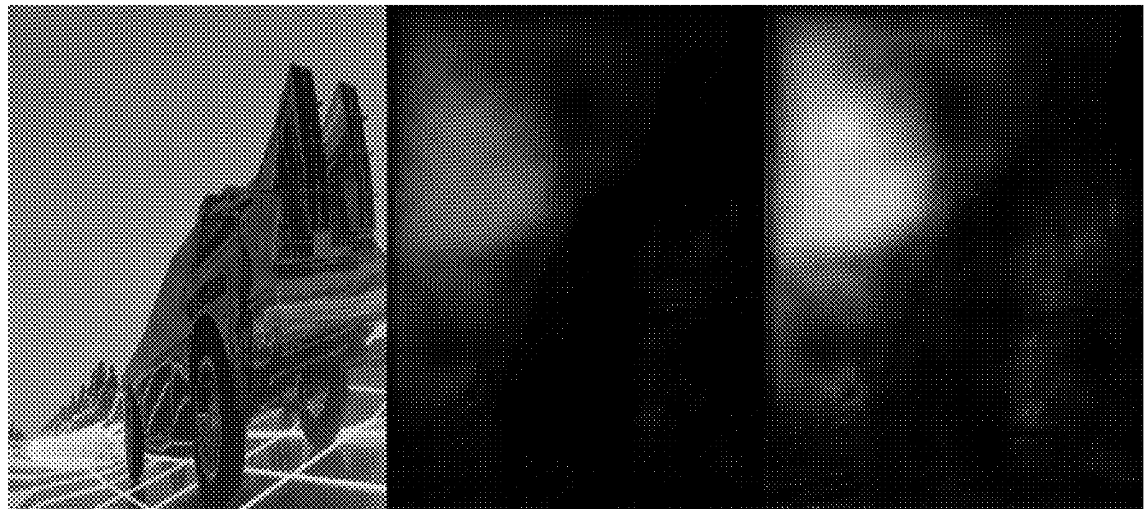
FIG. 3 is a schematic diagram showing a text area in an image to be rendered provided by embodiments of the present disclosure.

FIG. 3 is a schematic diagram showing a text area in an image to be rendered provided by an embodiment of the present disclosure. As shown in FIG. 3, the left image to be rendered in FIG. 3 is input to a segmentation model, which processes the image to obtain a grayscale image in the middle. The grayscale image is then binarized to obtain an image mask on the right.

In addition, the binarization process is used to distinguish an object from a background. The most commonly used method for binarizing a grayscale image is the thresholding method, which takes advantage of the difference between an object and a background in an image by dividing the image into two different levels, selecting an appropriate threshold, and determining whether a pixel belongs to the object or the background to obtain a binarized image.

In this embodiment, the thresholding method is used to binarize the grayscale image in the middle of FIG. 3, resulting in a binarized image on the right in FIG. 3.

S203: in response to a foreground region in the image mask being greater than or equal to a first threshold, arranging the text area in an area corresponding to the foreground region in the image to be rendered.

The foreground region can be understood as an area composed of white pixels in the binarized image mask, such as the white area in the right image of FIG. 3. The foreground region can also be referred to as a region of interest. A background region corresponding to the foreground region refers to an area composed of black pixels in the binarized image mask, such as the black area in the right image of FIG. 3.

The first threshold is used to determine whether the size of the foreground region in the image mask is too small. In response to the size of the foreground region in the image mask being greater than or equal to the first preset threshold, it indicates that the foreground region in the image mask has a larger size and can be used as a text area. In response to the size of the foreground region in the image mask being smaller than the first preset threshold, it indicates that the foreground region in the image mask is too small. A text area disposed in such an area may cause an image object to be obscured by the text, and thereby is not suitable. In this case, another position should be selected for the text area.

S204: determining a target character size of text based on a width of the bounding box and the number of text characters.

The attribute information of the text area comprises a width of the bounding box of the text area, and the target character style of text comprises a target character size of text. The bounding box of the text area can be understood as a bounding box of the white pixels in the right image of FIG. 3.

In some embodiments, determining a target character size of text based on a width of the bounding box and the number of text characters comprises: traversing each character size, starting with a largest character size; determining a text width based on a current character size and the number of text characters; and determining the current character size as the target character size of text in response to the text width being less than or equal to the width of the bounding box.

Note that the largest character size and the smallest character size can be specified in advance. The largest character size is usually the largest built-in character size of the system, e.g., size 0. The smallest character size is the smallest built-in character size of the system, for example, size 8 for Chinese characters.

In some embodiments, the smallest character size can be set based on the size of the image to be rendered. An image to be rendered that is too large and a text typeface that is too small will result in an unsightly and disharmonic display. A typeface that is too small will also affect the viewing experience for users. Therefore, setting the smallest character size according to the size of the image to be rendered can avoid excessive calculation of character size, thereby conserving resources and time.

In this embodiment, determining a text width based on the current character size and the number of text characters may comprise: determining the text width as a product of the width of a single character corresponding to the current character size and the number of text characters.

In some embodiments, each character size is traversed, starting with the largest character size; a text width is calculated as a product of the width of a single character corresponding to a current character size and the number of text characters; the current character size is determined as the target character size of text in response to the text width being less than or equal to the width of the bounding box.

For example, with the largest character size, i.e., size 0, as the current character size, a product of a single character width corresponding to size 0 and the number of text characters is calculated to obtain a text width; the text width is then compared with the width of the bounding box; if the text width is less than or equal to the width of the bounding box, size 0 is determined as the target character size of text. If the text width is greater than the width of the bounding box, a next smaller character size, such as small size 0, is selected as the current character size to calculate a product of the single character width corresponding to small size 0 and the number of text characters to obtain the text width; the text width is then compared with the width of the bounding box; if the text width is less than or equal to the width of the bounding box, small size 0 is determined as the target character size of text. If the text width is greater than the width of the bounding box, a next smaller character size, such as size 1, is selected as the current character size. Then, the step of calculating a product of the single character width corresponding to the current character size and the number of text characters to obtain a text width and the following steps are repeated until the text width is less than or equal to the width of the bounding box, and the current character size is determined as the target character size of text.

S205: converting the image to be rendered to the HSV color space.

In the HSV color space, a color is represented by three parameters: Hue (H), Saturation (S), and Brightness Value (V). The HSV color space is a three-dimensional representation of the RGB color system.

The Hue (H) component is measured in degrees, with a range of values from 0° to 360°. It is calculated counterclockwise from Red, wherein Red is 0°, Green is 120°, and Blue is 240°. Their complementary colors are Yellow at 60°, Cyan at 180°, and Purple at 300°.

The Saturation (S) component represents the degree to which a color approaches to a spectral color. A color can be considered as a result of mixing a spectral color with white. The larger the proportion of the spectral color, the closer the color is to the spectral color, and the higher the saturation of the color. High saturation results in vibrant colors. A spectral color has no white component and has the highest saturation. The saturation (S) component usually has a range of values from 0% to 100%, and the higher the value, the more saturated the color.

The Brightness value (V) component represents a degree of brightness of a color. For a light source color, the brightness value is related to the brightness of the emitting body; for an object color, this value is related to the transmittance or reflectance of the object. The V component usual has a range of values from 0% (black) to 100% (white).

S206: for one or more pixels in the image to be rendered, obtaining H values of the pixels in the HSV color space.

In some embodiments, the entire image to be rendered is converted to the HSV color space to obtain H values in the HSV color space.

In other implementations, an image portion corresponding to the text area in the image to be rendered is converted to the HSV color space to obtain H values in the HSV color space.

S207: determining the target color of text based on the H values of the one or more pixels.

In some embodiments, the target color of text is determined based on an average value H_Avg of the H component, an average value S_Avg of the S component, and an average value V_Avg of the V component.

In some embodiments, H values are extracted from the image to be rendered, or from an image portion corresponding to the text area of the image to be rendered, and an average H value corresponding to a plurality of pixels is calculated to obtain the average H value H_Avg.

Figure 4:
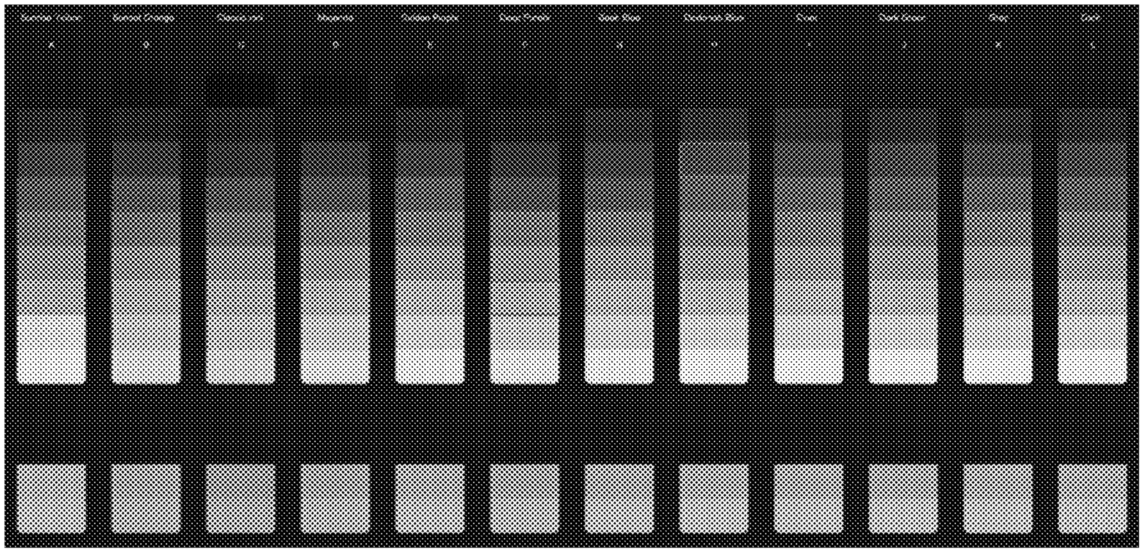
FIG. 4 is a schematic diagram of a text candidate set of color provided by embodiments of the present disclosure.

From a set S of all colors, a candidate set of color is determined for the text as colors corresponding to color values having a minimal difference in the H-value dimension with the average H value H_Avg. As shown in FIG. 4, which column of colors in FIG. 4 is the candidate set of color O is determined based on the average H value H_Avg. The minimal difference in H value ensures that the text color looks harmonious and beautiful.

Furthermore, any color can be selected from the candidate set of color as the target color of text; or a color with a highest saturation or brightness value can be selected from the candidate set of color as the target color of text.

In some embodiments, determining the target color of text based on the H values of a plurality of pixels comprises: calculating an average hue value of the hue values of the one or more pixels; determining a candidate set of color based on the average hue value; for at least one pixel in the image to be rendered, obtaining at least one of a saturation value or a brightness value of the pixel in the HSV color space; and selecting the target color of text from the candidate set of color based on at least one of saturation values or brightness values of the one or more pixels.

In some embodiments, H values in the HSV color space are extracted for the image to be rendered, and an average H value H_Avg of the corresponding text area is calculated to find a color value with a maximum difference from H_Avg as the text color value.

In some embodiments, the target color of text is selected from the candidate set of color based on at least one of the S values and the V values of a plurality of pixels, which comprises: calculating at least one of an average saturation value or an average brightness value of the one or more pixels; for each color value in the candidate set of color, calculating at least one of a first difference between the color value and the average saturation value, or a second difference between the color value and the average brightness value; and determining at least one of a color corresponding to a maximum value of first differences or a color corresponding to a maximum value of second differences as the target color of text.

In some embodiments, in response to the color value corresponding to the maximum value of the first difference and the color value corresponding to the maximum value of the second difference being the same color value, a color corresponding to that color value is determined as the target color of text. In response to the color value corresponding to the maximum value of the first difference being not the same as the color value corresponding to the maximum value of the second difference, a color corresponding to a color value resulting in the maximum value of the first difference or a color corresponding to a color value resulting in the maximum value of the second difference is selected as the target color of text.

In some embodiments, selecting a color with the maximum difference from the average S value or a color with the maximum difference from the average V value as the target color of text can increase the contrast between the text color and the background color, which is beneficial for improving the reading experience.

S208: rendering the image to be rendered based on the target character style of text and the target pattern style of text.

S209: setting the rendered image as a cover of the video to be processed.

In an embodiment, the image rendering method provided in the present disclosure further comprises: dividing the image to be rendered into a first region and a second region in response to a foreground region in the image mask being less than a first threshold; and arranging the text area in the first region or the second region.

The first threshold is used to determine whether the size of the foreground region in the image mask is too small. In a case where the foreground region in the image mask is smaller than the preset first threshold, it indicates that the foreground region in the image mask is too small to be used as a text area, and another area needs to be selected for the text area. The first and second regions can be understood as two different regions of a major image part. Optionally, the first region is a sky region, and the second region is a ground region; optional, the first region is a beach region, and the second region is a sea region.

In some embodiments, the image to be rendered is divided into two different regions; the text area is arranged in the first region or the second region. The method of dividing the image to be rendered into two regions will not be repeated in this embodiment.

In some embodiments, the size of the first region and the size of the second region are determined, and the text area is arranged in a larger region. In a case where the area difference between the two regions is not significant, a region relatively close to the top or left of the image to be rendered is selected for the text area. This can help to ensure that the text is aesthetically pleasing and harmonious.

In some embodiments, in response to the first region being less than a second threshold, or the second region being less than the second threshold, the text area is disposed at a preset position in the image to be rendered.

The second threshold is used to determine whether the first region or the second region is too small. In a case where both the first and second regions are smaller than the second preset threshold, it indicates that they are both too small to dispose the text area, and another region needs to be selected for the text area. In this case, any position in the image to be rendered can be specified to dispose the text area.

Optionally, the preset position in the image to be rendered can be the middle of the image to be rendered. It is also possible to segment the image to be rendered according to a particular ratio and dispose the text area at the segment point. The particular ratio can be a four-six ratio, a three-seven ratio, or a golden ratio. This can help to ensure that the text is aesthetically pleasing and harmonious.

Figure 5:
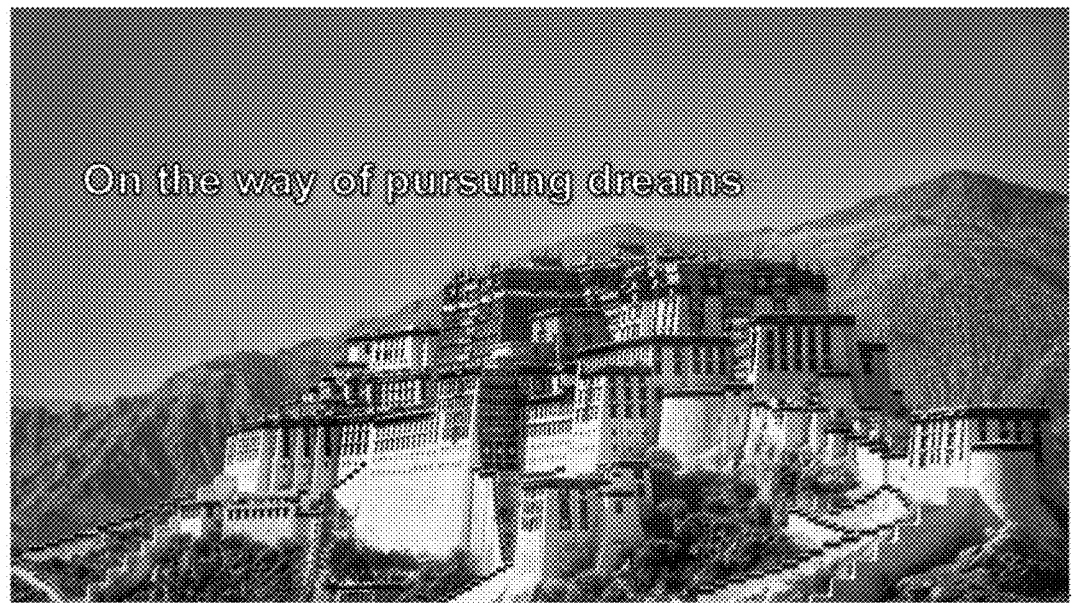
FIG. 5 is a schematic diagram of a rendered image provided by embodiments of the present disclosure.

As shown in FIG. 5, the image to be rendered is segmented into sky and ground regions; the text area is disposed in the sky region. That is, the text "On the way of perusing dreams" will be added to the sky region.

In some embodiments, in a case where the text information comprises a main title and a subtitle, the text area can be divided into a main title area and a subtitle area. The text area can be divided into two regions on average. It can also be divided according to a specific ratio.

In addition, in a case where the text area is too small to be divided, the text area can be used as the main title area and a neighboring area can be used as the subtitle area.

Figure 6:
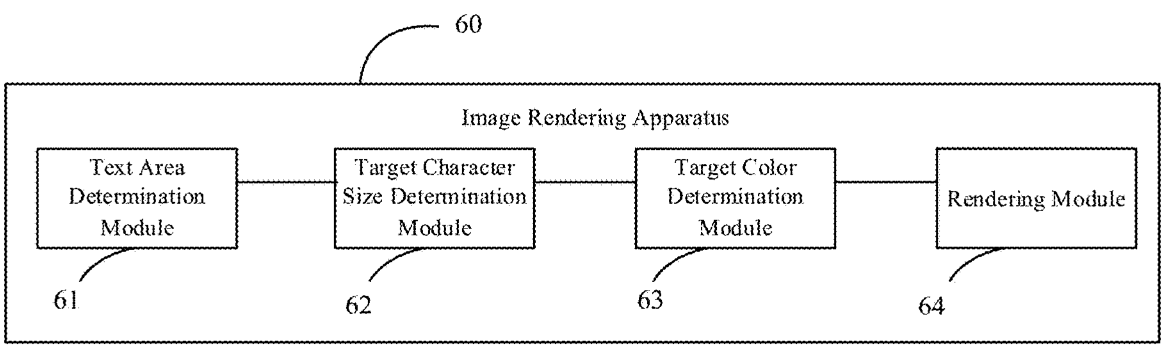
FIG. 6 is a schematic structural diagram of an image rendering apparatus provided by embodiments of the present disclosure.

FIG. 6 is a schematic structure diagram of an image rendering apparatus according to an embodiment of the present disclosure, suitable for adding text to any image. The image rendering apparatus can be implemented in software and/or hardware, and can be configured in an electronic device.

As shown in FIG. 6, the image rendering apparatus provided in this embodiment mainly comprises a text area determination module 61, a character style determination module 62, a pattern style determination module 63, and a rendering module 64.

The text area determination module 61 is used for processing an image to be rendered to determine a text area; a character style determination module 62 is used for determining a target character style of text based on attribute information of the text area; a pattern style determination module 63 is used for determining a target pattern style of text based on the image to be rendered; the rendering module 64 is used for rendering the image to be rendered based on the target character style of text and the target pattern style of text.

An embodiment of the present disclosure provides an image rendering apparatus for executing the following steps: processing an image to be rendered to determine a text area; determining a target character style of text based on attribute information of the text area; determining a target pattern style of text based on the image to be rendered; and rendering the image to be rendered based on the target character style of text and the target pattern style of text. In this embodiment of the present disclosure, a text character style is determined based on the obtained text area, a text pattern style is determined based on the image to be rendered, and text is rendered based on the text character style and the text pattern style and then added to the text area in the image. Thus, text characters can be placed in the image harmoniously and aesthetically, thereby achieving fast rendering of the image.

In some embodiments, the text area determination module comprises: an image mask determination unit for inputting the image to be rendered into a segmentation model to obtain an image mask; and determining the text area corresponding to the image to be rendered based on the image mask.

In some embodiments, the text area determination unit is further used for, in response to a foreground region in the image mask being greater than or equal to a first threshold, arranging the text area in an area corresponding to the foreground region in the image to be rendered.

In some embodiments, the text area determination module further comprises: an image dividing unit for dividing the image to be rendered into a first region and a second region in response to a foreground region in the image mask being less than a first threshold; the text area determination unit is further used for using the sky region or the ground region as the text area.

In some embodiments, the text area determination unit is further used for arranging the text area at a preset position in the image to be rendered in response to the first region being less than a second threshold or the second region being less than the second threshold.

In some embodiments, the target pattern style of text comprises: a target color of text; and the pattern style determination module comprises: an image conversion unit for converting the image to be rendered to a HSV color space; a hue value acquisition unit for, for one or more pixels in the image to be rendered, obtaining hue values of the pixels in the HSV color space; a target color unit for determining the target color of text based on the hue values of the one or more pixels.

In some embodiments, the target color unit comprises: an average Hue calculation subunit for calculating an average hue value of the hue values of the one or more pixels; a candidate set of color determination subunit for determining a candidate set of color based on the average hue value; a saturation and value acquisition subunit for, for at least one pixel in the image to be rendered, obtaining at least one of a saturation value or a brightness value of the pixel in the HSV color space; a target color determination subunit for selecting the target color of text from the candidate set of color based on at least one of saturation values or brightness values of the one or more pixels.

In some embodiments, the target color determination subunit is particularly used for calculating at least one of an average saturation value or an average brightness value of the one or more pixels; for each color value in the candidate set of color, calculating at least one of a first difference between the color value and the average saturation value, or a second difference between the color value and the average brightness value; determining at least one of a color corresponding to a maximum value of first differences or a color corresponding to a maximum value of second differences as the target color of text.

In some embodiments, the attribute information of the text area comprises a width of a bounding box of the text area, and the target character style of text comprises a target character size of text; the character style determination module is used for determining the target character size of text based on the width of the bounding box and a number of text characters.

In some embodiments, the character style determination module is particularly used for traversing each character size, starting with a largest character size; determining a text width based on a current character size and the number of text characters; and determining the current character size as the target character size of text in response to the text width being less than or equal to the width of the bounding box.

In some embodiments, the apparatus further comprises: an to-be-rendered image determination module for selecting a video frame from a video to be processed as the image to be rendered; the apparatus further comprises: a cover determination module for, after rendering the image to be rendered based on the target character style of text and the target pattern style of text, using the rendered image as a cover of the video to be processed.

In some embodiments, the apparatus further comprises: an instruction generation module for, after receiving a video uploaded by a user, generating a cover generation instruction in response to detecting the video does not have a cover.

The image rendering apparatus provided in this embodiment can execute the steps of the image rendering method provided in an embodiment of the present disclosure. The steps involved and the beneficial effect achieved will not be described in detail.

Figure 7:
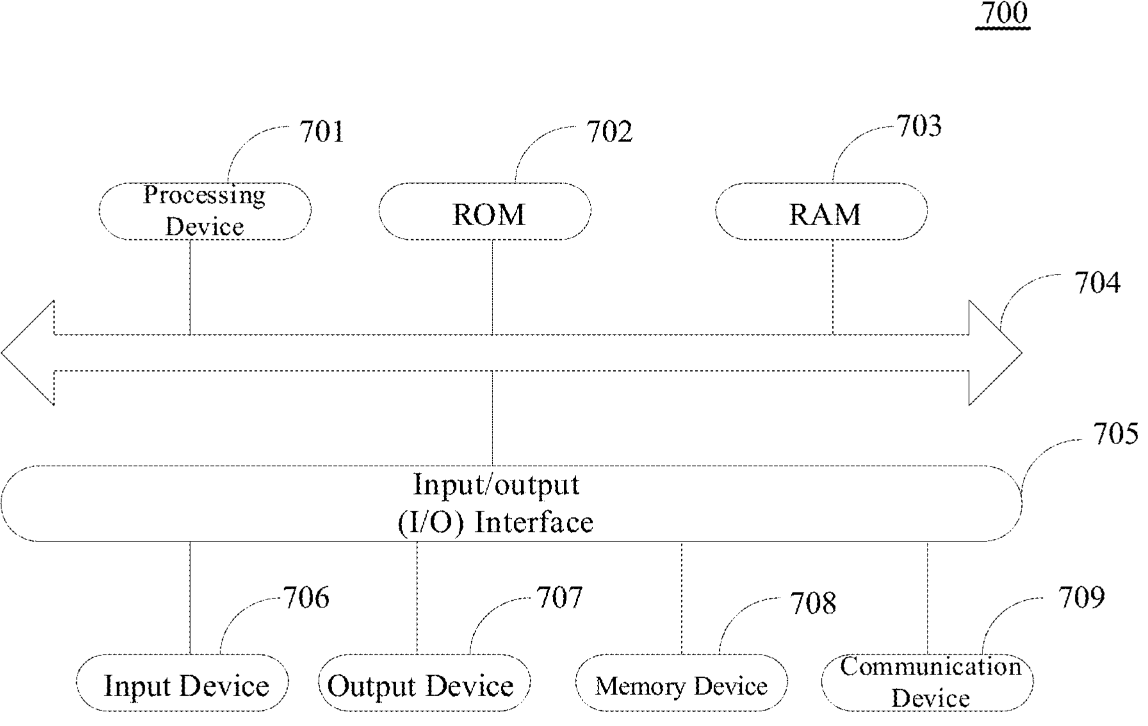
FIG. 7 is a schematic structural diagram of an electronic device provided by embodiments of the present disclosure.

FIG. 7 is a schematic structural diagram of an electronic device provided by an embodiment of the present disclosure. Referring to FIG. 7, a schematic structural diagram of an electronic device 700 suitable for implementing the embodiments of the present disclosure is shown. The electronic device 700 of the embodiment of the present disclosure may include, but not limited to, a mobile terminal such as a mobile phone, a notebook computer, a digital broadcast receiver, a PDA (Personal Digital Assistant), a PAD (tablet computer), a PMP (Portable Multimedia Player), an on-board terminal (such as an on-board navigation terminal), or a wearable electronic device, and a fixed terminal such as a digital TV, a desktop computer, or a smart-home device. The electronic device shown in FIG. 7 is merely an example and should not impose any limitation on the function and scope of the embodiments of the present disclosure.

As shown in FIG. 7, the electronic device 700 may include a processing device (e.g., a central processing unit, a graphics processor) 701, which may perform various appropriate actions and processes to implement the image rendering method of the embodiment of the present disclosure according to a program stored in Read Only Memory (ROM) 702 or a program loaded from storage device 708 into Random Access Memory (RAM) 703. In RAM 703, various programs and data required for the operation of the electronic device 700 are also stored. Processing device 701, ROM 702 and RAM 703 are connected to each other through bus 704. An input/output (I/O) interface 705 is also connected to the bus 704.

Generally, the following devices can be connected to I/O interface 705: input devices 606 including, for example, a touch screen, a touch pad, a keyboard, a mouse, a camera, a microphone, an accelerometer, a gyroscope, etc.; output devices 707 including a liquid crystal display (LCD), a speaker, a vibrator, etc.; a storage device 708 such as a magnetic tape, a hard disk, etc.; and a communication device 709. The communication device 709 enables the electronic device 700 to communicate in a wireless or wired manner with other devices to exchange data. Although FIG. 7 shows the electronic device 700 with various components, it should be understood that it is not required to implement or have all of these components. Alternatively, more or fewer components can be implemented or provided.

In particular, according to an embodiment of the present disclosure, the processes described above with reference to the flowchart can be implemented as a computer software program. For example, an embodiment of the present disclosure includes a computer program product, which includes a computer program carried on a non-transitory computer readable medium, and containing program code for executing the method shown in the flowchart to implement the above image rendering method. In such an embodiment, the computer program may be downloaded and installed from the network through the communication device 709, or installed from the storage device 708, or from the ROM 702. When the computer program is executed by the processing device 701, the above functions defined in the method of the embodiment of the present disclosure are performed.

It should be noted that the computer readable medium in the present disclosure may be a computer readable signal medium or a computer readable storage medium, or any combination of thereof. The computer readable storage medium can be, for example, but not limited to, an electronic, magnetic, optical, electromagnetic, infrared, or semiconductor system, apparatus, or device, or any combination of the above. More specific examples of the computer readable storage medium may include, but are not limited to: electrical connection with one or more wires, portable computer disk, hard disk, random access memory (RAM), read only memory (ROM), erasable programmable read only memory (EPROM or flash), fiber optics, portable compact disk Read only memory (CD-ROM), optical storage device, magnetic storage device, or any suitable combination of the foregoing. In the present disclosure, a computer readable storage medium can be any tangible medium that can contain or store a program, which can be used by or in connection with an instruction execution system, apparatus or device. In the present disclosure, a computer readable signal medium may include a data signal that is propagated in the baseband or as part of a carrier, carrying computer readable program code. Such propagated data signals can take a variety of forms including, but not limited to, electromagnetic signals, optical signals, or any suitable combination of the foregoing. The computer readable signal medium can also be any computer readable medium other than a computer readable storage medium, which can transmit, propagate, or transport a program for use by or in connection with the instruction execution system, apparatus, or device. Program code embodied on a computer readable medium can be transmitted by any suitable medium, including but not limited to wire, fiber optic cable, RF (radio frequency), etc., or any suitable combination of the foregoing.

In some embodiments, a client and a server can communicate using any currently known or future developed network protocol such as HTTP (HyperText Transfer Protocol), and can be interconnected by any form or medium of digital data communication, e.g., a communication network. Examples of communication networks include a local area network ("LAN") and a wide area network ("WAN"), the Internet, and end-to-end networks (for example, ad hoc end-to-end networks), as well as any currently known or future developed networks.

The above computer readable medium may be included in the electronic device described above; or it may exist alone without being assembled into the electronic device.

The computer readable medium carries one or more programs that, when executed by the terminal device, cause the terminal device to perform steps of: processing an image to be rendered to determine a text area; determining a target character size of text based on attribute information of the text area; determining a target color of text based on the background color information of the image to be rendered; and rendering the image to be rendered based on the target character size of text and the target color of text.

Optionally, when the terminal device performs the above one or more programs, the terminal device may also perform other steps in the above embodiments.

The computer program code for executing operations of the present disclosure may be complied by any combination of one or more program design languages, the program design languages including object-oriented program design languages, such as Java, Smalltalk, C++, etc., as well as conventional procedural program design languages, such as "C" program design language or similar program design language. A program code may be completely or partly executed on a user computer, or executed as an independent software package, partly executed on the user computer and partly executed on a remote computer, or completely executed on a remote computer or server. In the latter circumstance, the remote computer may be connected to the user computer through various kinds of networks, including local area network (LAN) or wide area network (WAN), or connected to external computer (for example using an internet service provider via Internet).

The flowcharts and block diagrams in the different depicted embodiments illustrate the architecture, functionality, and operation of some possible implementations of apparatus, methods and computer program products. In this regard, each block in the flowchart or block diagrams may represent a module, segment, or portion of code, which comprises one or more executable instructions for implementing the specified function or functions. It should also be noted that, in some alternative implementations, the functions noted in the block may occur out of the order noted in the drawings. For example, two blocks shown in succession may be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The units involved in the embodiments described in the present disclosure can be implemented in software or hardware. Wherein, the names of the units do not constitute a limitation on the units themselves under certain circumstances.

The functions described above may be performed at least in part by one or more hardware logic components. For example, without limitation, exemplary types of hardware logic components that can be used include: Field Programmable Gate Array (FPGA), Application Specific Integrated Circuit (ASIC), Application Specific Standard Product (ASSP), System on Chip (SOC), Complex Programmable Logic Device (CPLD), etc.

In the context of the present disclosure, a machine-readable medium may be a tangible medium, which may contain or store a program for use by or in connection with an instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination of thereof. More specific examples of the machine-readable storage medium may include electrical connection with one or more wires, portable computer disk, hard disk, random access memory (RAM), read only memory (ROM), erasable programmable read only memory (EPROM or flash), fiber optics, portable compact disk Read only memory (CD-ROM), optical storage device, magnetic storage device, or any suitable combination of the foregoing.

According to one or more embodiments of the present disclosure, the present disclosure provides an image rendering method, comprising: processing an image to be rendered to determine a text area; determining a target character style of text based on attribute information of the text area; determining a target pattern style of text based on the image to be rendered; and rendering the image to be rendered based on the target character style of text and the target pattern style of text.

According to one or more embodiments of the present disclosure, the present disclosure provides an image rendering method, wherein the processing the image to be rendered to determine the text area comprises: inputting the image to be rendered into a segmentation model to obtain an image mask; and determining the text area corresponding to the image to be rendered based on the image mask.

According to one or more embodiments of the present disclosure, the present disclosure provides an image rendering method, wherein the determining the text area corresponding to the image to be rendered based on the image mask comprises: in response to a foreground region in the image mask being greater than or equal to a first threshold, arranging the text area in an area corresponding to the foreground region in the image to be rendered.

According to one or more embodiments of the present disclosure, the present disclosure provides an image rendering method, further comprising dividing the image to be rendered into a first region and a second region in response to a foreground region in the image mask being less than a first threshold; and arranging the text area in the first region or the second region.

According to one or more embodiments of the present disclosure, the present disclosure provides an image rendering method, comprising arranging the text area at a preset position in the image to be rendered in response to the first region being less than a second threshold or the second region being less than the second threshold.

According to one or more embodiments of the present disclosure, the present disclosure provides an image rendering method, wherein the target pattern style of text comprises a target color of text, and the determining the target pattern style of text based on the image to be rendered comprises: converting the image to be rendered to a Hue, Saturation, Value (HSV) color space; for one or more pixels in the image to be rendered, obtaining hue values of the pixels in the HSV color space; and determining the target color of text based on the hue values of the one or more pixels.

According to one or more embodiments of the present disclosure, the present disclosure provides an image rendering method, wherein the determining the target color of text based on the hue values of the one or more pixels comprises: calculating an average hue value of the hue values of the one or more pixels; determining a candidate set of color based on the average hue value; for at least one pixel in the image to be rendered, obtaining at least one of a saturation value or a brightness value of the pixel in the HSV color space; and selecting the target color of text from the candidate set of color based on at least one of saturation values or brightness values of the one or more pixels.

According to one or more embodiments of the present disclosure, the present disclosure provides an image rendering method, wherein the selecting the target color of text from the candidate set of color based on at least one of the saturation values or the brightness values of the one or more pixels comprises: calculating at least one of an average saturation value or an average brightness value of the one or more pixels; for each color value in the candidate set of color, calculating at least one of a first difference between the color value and the average saturation value, or a second difference between the color value and the average brightness value; and determining at least one of a color corresponding to a maximum value of first differences or a color corresponding to a maximum value of second differences as the target color of text.

According to one or more embodiments of the present disclosure, the present disclosure provides an image rendering method, wherein the attribute information of the text area comprises a width of a bounding box of the text area, and the target character style of text comprises a target character size of text, and the determining the target character style of text based on the attribute information of the text area comprises: determining the target character size of text based on the width of the bounding box and a number of text characters.

According to one or more embodiments of the present disclosure, the present disclosure provides an image rendering method, wherein the determining the target character size of text based on the width of the bounding box and the number of text characters comprises: traversing each character size, starting with a largest character size; determining a text width based on a current character size and the number of text characters; and determining the current character size as the target character size of text in response to the text width being less than or equal to the width of the bounding box.

According to one or more embodiments of the present disclosure, the present disclosure provides an image rendering method, further comprising: selecting a video frame from a video to be processed as the image to be rendered; and after rendering the image to be rendered based on the target character style of text and the target pattern style of text, using the rendered image as a cover of the video to be processed.

According to one or more embodiments of the present disclosure, the present disclosure provides an image rendering method, further comprising after receiving a video uploaded by a user, generating a cover generation instruction in response to detecting the video does not have a cover.

According to one or more embodiments of the present disclosure, the present disclosure provides an image rendering apparatus, comprising: a text area determination module for processing an image to be rendered to determine a text area; a target character size determination module for determining a target character style of text based on attribute information of the text area; a target color determination module for determining a target pattern style of text based on background color information of the image to be rendered; and a rendering module for rendering the image to be rendered based on the target character style of text and the target pattern style of text.

According to one or more embodiments of the present disclosure, the present disclosure provides an image rendering apparatus, wherein the text area determination module comprises: an image mask determination unit for inputting the image to be rendered into a segmentation model to obtain an image mask; and determining the text area corresponding to the image to be rendered based on the image mask.

According to one or more embodiments of the present disclosure, the present disclosure provides an image rendering apparatus, wherein the text area determination unit is further used for, in response to a foreground region in the image mask being greater than or equal to a first threshold, arranging the text area in an area corresponding to the foreground region in the image to be rendered.

According to one or more embodiments of the present disclosure, the present disclosure provides an image rendering apparatus, wherein the text area determination module further comprises: an image dividing unit for dividing the image to be rendered into a first region and a second region in response to a foreground region in the image mask being less than a first threshold; the text area determination unit is further used for using the sky region or the ground region as the text area.

According to one or more embodiments of the present disclosure, the present disclosure provides an image rendering apparatus, wherein the text area determination unit is further used for arranging the text area at a preset position in the image to be rendered in response to the first region being less than a second threshold or the second region being less than the second threshold.

According to one or more embodiments of the present disclosure, the present disclosure provides an image rendering apparatus, wherein the target pattern style of text comprises a target color of text; and the pattern style determination module comprises: an image conversion unit for converting the image to be rendered to a Hue, Saturation, Value (HSV) color space; a hue value acquisition unit for, for one or more pixels in the image to be rendered, obtaining hue values of the pixels in the HSV color space; a target color unit for determining the target color of text based on the hue values of the one or more pixels.

According to one or more embodiments of the present disclosure, the present disclosure provides an image rendering apparatus, wherein the target color unit comprises: an average hue calculation subunit for calculating an average hue value of the hue values of the one or more pixels; a candidate set of color determination subunit for determining a candidate set of color based on the average hue value; a saturation and brightness acquisition subunit for, for at least one pixel in the image to be rendered, obtaining at least one of a saturation value or a brightness value of the pixel in the HSV color space; a target color determination subunit for selecting the target color of text from the candidate set of color based on at least one of the saturation values and the brightness values of one or more pixels.

According to one or more embodiments of the present disclosure, the present disclosure provides an image rendering apparatus, wherein the target color determination subunit is particularly used for calculating at least one of an average saturation value or an average brightness value of the one or more pixels; for each color value in the candidate set of color, calculating at least one of a first difference between the color value and the average saturation value, or a second difference between the color value and the average brightness value; and determining at least one of a color corresponding to a maximum value of first differences or a color corresponding to a maximum value of second differences as the target color of text.

According to one or more embodiments of the present disclosure, the present disclosure provides an image rendering apparatus, wherein the attribute information of the text area includes a width of a bounding box of the text area, and the target character style of text includes a target character size of text; the character style determination module is used for determining the target character size of text based on the width of the bounding box and a number of text characters.

According to one or more embodiments of the present disclosure, the present disclosure provides an image rendering apparatus, wherein the character style determination module is particularly used for traversing each character size, starting with a largest character size; determining a text width based on a current character size and the number of text characters; determining the current character size as the target character size of text in response to the text width being less than or equal to the width of the bounding box.

According to one or more embodiments of the present disclosure, the present disclosure provides an image rendering apparatus, further comprising: an to-be-rendered image determination module for selecting a video frame from a video to be processed as the image to be rendered; the apparatus further comprises: a cover determination module for after rendering the image to be rendered based on the target character style of text and the target pattern style of text, using the rendered image as a cover of the video to be processed.

In some embodiments, the apparatus further comprises: an instruction generation module for, after receiving a video uploaded by a user, generating a cover generation instruction in response to detecting the video does not have a cover.

According to one or more embodiments of the present disclosure, the present disclosure provides an electronic device, comprising:

one or more processors;

a memory for storing one or more programs that, when executed by the one or more processors, cause the one or more processors to implement the image rendering method provided by the present disclosure.

According to one or more embodiments of the present disclosure, the present disclosure provides a computer-readable medium stored thereon a computer program that, when executed by a processor, implements the image rendering method provided by the present disclosure.

An embodiment of the present disclosure further provides a computer program product comprising computer programs or instructions that, when executed by a processor, implement the above image rendering method.

The above description is only preferred embodiments of the present disclosure and an explanation of the applied technical principles. Those skilled in the art should understand that the scope of disclosure involved in this disclosure is not limited to the technical solutions formed by the specific combination of the above technical features, and should also cover other technical solutions formed by any combination of the above technical features or their equivalent features without departing from the disclosed concept, for example, technical solutions formed by replacing the above features with technical features having similar functions to (but not limited to) those disclosed in the present disclosure.

In addition, although the operations are depicted in a specific order, this should not be understood as requiring these operations to be performed in the specific order shown or performed in a sequential order. Under certain circumstances, multitasking and parallel processing may be advantageous. Likewise, although several specific implementation details are included in the above discussion, these should not be construed as limiting the scope of the present disclosure. Certain features that are described in the context of separate embodiments can also be implemented in combination in a single embodiment. Conversely, various features described in the context of a single embodiment can also be implemented in multiple embodiments individually or in any suitable subcombination.

Although the subject matter has been described in language specific to structural features and/or logical actions of the method, it should be understood that the subject matter defined in the appended claims is not necessarily limited to the specific features or actions described above. On the contrary, the specific features and actions described above are merely exemplary forms of implementing the claims.

What is claimed is:

1. An image rendering method, comprising:

processing an image to be rendered to determine a text area;

determining a character style of text based on attribute information of the text area;

determining a pattern style of text based on the image to be rendered; and rendering the image to be rendered based on the character style of text and the pattern style of text, wherein the pattern style of text comprises a color of text, and the determining the pattern style of text based on the image to be rendered comprises:

converting the image to be rendered to a Hue, Saturation, Value (HSV) color space, for one or more pixels in the image to be rendered, obtaining hue values of the pixels in the HSV color space, and determining the color of text based on the hue values of the one or more pixels, wherein the determining the color of text based on the hue values of the one or more pixels comprises:

calculating an average hue value of the hue values of the one or more pixels, determining a candidate set of color based on the average hue value, for at least one pixel in the image to be rendered, obtaining at least one of a saturation value or a brightness value of the pixel in the HSV color space, and selecting the color of text from the candidate set of color based on at least one of saturation values or brightness values of the one or more pixels.

2. The image rendering method according to claim 1, wherein the processing the image to be rendered to determine the text area comprises:

inputting the image to be rendered into a segmentation model to obtain an image mask; and determining the text area corresponding to the image to be rendered based on the image mask.

3. The image rendering method according to claim 2, wherein the determining the text area corresponding to the image to be rendered based on the image mask comprises:

in response to a foreground region in the image mask being greater than or equal to a first threshold, arranging the text area in an area corresponding to the foreground region in the image to be rendered.

4. The image rendering method according to claim 2, further comprising:

dividing the image to be rendered into a first region and a second region in response to a foreground region in the image mask being less than a first threshold; and arranging the text area in the first region or the second region.

5. The image rendering method according to claim 4, further comprising:

arranging the text area at a preset position in the image to be rendered in response to the first region being less than a second threshold or the second region being less than the second threshold.

6. The image rendering method according to claim 1, wherein the selecting the color of text from the candidate set of color based on at least one of the saturation values or the brightness values of the one or more pixels comprises:

calculating at least one of an average saturation value or an average brightness value of the one or more pixels;

for each color value in the candidate set of color, calculating at least one of a first difference between the color value and the average saturation value, or a second difference between the color value and the average brightness value; and determining at least one of a color corresponding to a maximum value of first differences or a color corresponding to a maximum value of second differences as the color of text.

7. The image rendering method according to claim 1, wherein the attribute information of the text area comprises a width of a bounding box of the text area, and the character style of text comprises a character size of text, and the determining the character style of text based on the attribute information of the text area comprises:

determining the character size of text based on the width of the bounding box and a number of text characters.

8. The image rendering method according to claim 7, wherein the determining the character size of text based on the width of the bounding box and the number of text characters comprises:

traversing each character size, starting with a largest character size;

determining a text width based on a current character size and the number of text characters; and determining the current character size as the character size of text in response to the text width being less than or equal to the width of the bounding box.

9. The image rendering method according to claim 1, further comprising:

selecting a video frame from a video to be processed as the image to be rendered; and after rendering the image to be rendered based on the character style of text and the pattern style of text, using the rendered image as a cover of the video to be processed.

10. The image rendering method according to claim 9, further comprising:

after receiving a video uploaded by a user, generating a cover generation instruction in response to detecting the video does not have a cover.

11. An electronic device, comprising:

one or more processors;

a memory device for storing one or more programs that, when executed by the one or more processors, cause the one or more processors to implement operations comprising:

processing an image to be rendered to determine a text area;

determining a character style of text based on attribute information of the text area;

determining a pattern style of text based on the image to be rendered; and rendering the image to be rendered based on the character style of text and the pattern style of text, wherein the pattern style of text comprises a color of text, and the determining the pattern style of text based on the image to be rendered comprises:

converting the image to be rendered to a Hue, Saturation, Value (HSV) color space, for one or more pixels in the image to be rendered, obtaining hue values of the pixels in the HSV color space, and determining the color of text based on the hue values of the one or more pixels, wherein the determining the color of text based on the hue values of the one or more pixels comprises:

calculating an average hue value of the hue values of the one or more pixels, determining a candidate set of color based on the average hue value, for at least one pixel in the image to be rendered, obtaining at least one of a saturation value or a brightness value of the pixel in the HSV color space, and selecting the color of text from the candidate set of color based on at least one of saturation values or brightness values of the one or more pixels.

12. The electronic device according to claim 11, wherein the one or more programs further cause the one or more processors to:

input the image to be rendered into a segmentation model to obtain an image mask; and determine the text area corresponding to the image to be rendered based on the image mask.

13. The electronic device according to claim 12, wherein the one or more programs further cause the one or more processors to:

in response to a foreground region in the image mask being greater than or equal to a first threshold, arrange the text area in an area corresponding to the foreground region in the image to be rendered.

14. The electronic device according to claim 12, wherein the one or more programs further cause the one or more processors to:

divide the image to be rendered into a first region and a second region in response to a foreground region in the image mask being less than a first threshold; and arrange the text area in the first region or the second region.

15. The electronic device according to claim 14, wherein the one or more programs further cause the one or more processors to:

arrange the text area at a preset position in the image to be rendered in response to the first region being less than a second threshold or the second region being less than the second threshold.

16. A non-transitory computer-readable storage medium stored thereon a computer program that, when executed by a processor, implements operations comprising:

processing an image to be rendered to determine a text area;

determining a character style of text based on attribute information of the text area;

determining a pattern style of text based on the image to be rendered; and rendering the image to be rendered based on the character style of text and the pattern style of text, wherein the pattern style of text comprises a color of text, and the determining the pattern style of text based on the image to be rendered comprises:

converting the image to be rendered to a Hue, Saturation, Value (HSV) color space, for one or more pixels in the image to be rendered, obtaining hue values of the pixels in the HSV color space, and determining the color of text based on the hue values of the one or more pixels, wherein the determining the color of text based on the hue values of the one or more pixels comprises:

calculating an average hue value of the hue values of the one or more pixels, determining a candidate set of color based on the average hue value, for at least one pixel in the image to be rendered, obtaining at least one of a saturation value or a brightness value of the pixel in the HSV color space, and selecting the color of text from the candidate set of color based on at least one of saturation values or brightness values of the one or more pixels.

17. The non-transitory computer-readable storage medium according to claim 16, wherein the processing the image to be rendered to determine the text area comprises:

inputting the image to be rendered into a segmentation model to obtain an image mask; and determining the text area corresponding to the image to be rendered based on the image mask.

18. The non-transitory computer-readable storage medium according to claim 16, wherein the selecting the color of text from the candidate set of color based on at least one of the saturation values or the brightness values of the one or more pixels comprises:

calculating at least one of an average saturation value or an average brightness value of the one or more pixels;

for each color value in the candidate set of color, calculating at least one of a first difference between the color value and the average saturation value, or a second difference between the color value and the average brightness value; and determining at least one of a color corresponding to a maximum value of first differences or a color corresponding to a maximum value of second differences as the color of text.

19. The non-transitory computer-readable storage medium according to claim 16, wherein the attribute information of the text area comprises a width of a bounding box of the text area, and the character style of text comprises a character size of text, and the determining the character style of text based on the attribute information of the text area comprises:

determining the character size of text based on the width of the bounding box and a number of text characters.

20. The non-transitory computer-readable storage medium according to claim 16, the operations further comprising:

selecting a video frame from a video to be processed as the image to be rendered; and after rendering the image to be rendered based on the character style of text and the pattern style of text, using the rendered image as a cover of the video to be processed.

* * * * *